Sept. 9, 1952 E. C. KIEKHAEFER 2,609,801
INTERNAL-COMBUSTION ENGINE AND COOLING SYSTEM THEREFOR
Filed Sept. 24, 1949 4 Sheets-Sheet 1

INVENTOR.
Elmer C. Kiekhaefer
BY
Andrus & Sceales
Attorneys

Sept. 9, 1952 — E. C. KIEKHAEFER — 2,609,801
INTERNAL-COMBUSTION ENGINE AND COOLING SYSTEM THEREFOR
Filed Sept. 24, 1949 — 4 Sheets-Sheet 2

INVENTOR.
Elmer C. Kiekhaefer
BY
Andrus & Seeler
Attorneys

Sept. 9, 1952  E. C. KIEKHAEFER  2,609,801
INTERNAL-COMBUSTION ENGINE AND COOLING SYSTEM THEREFOR
Filed Sept. 24, 1949  4 Sheets-Sheet 3

INVENTOR.
Elmer C. Kiekhaefer
BY
Andrus & Stealer
Attorneys

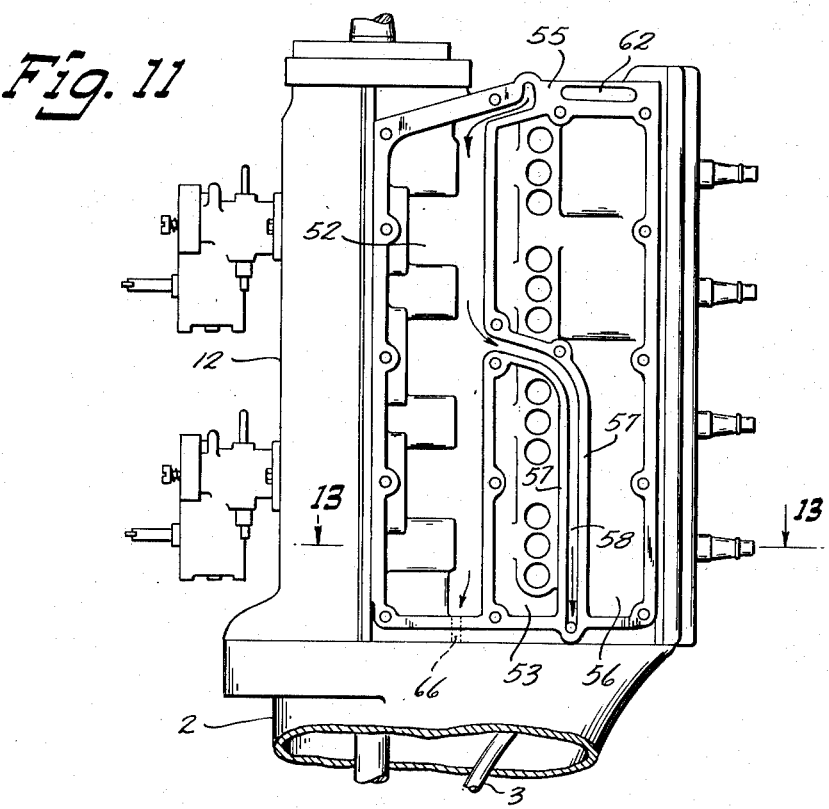
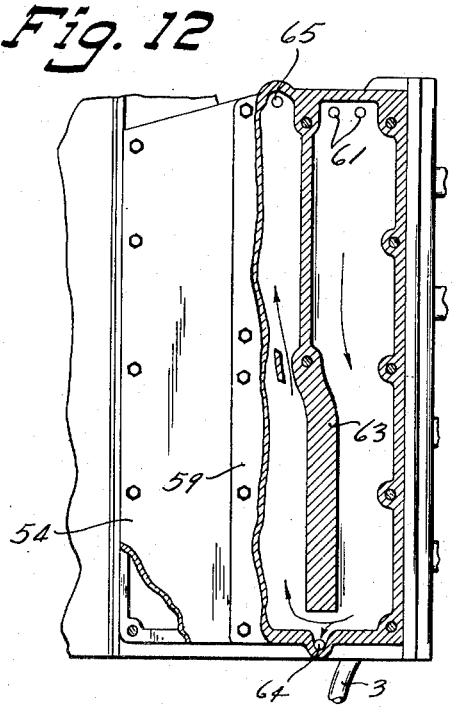
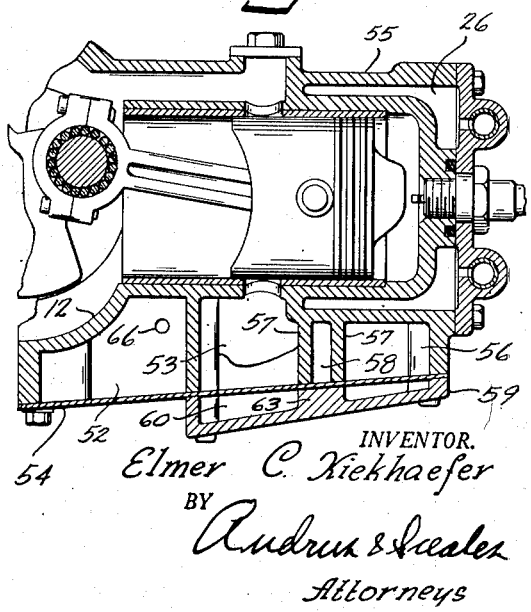

Patented Sept. 9, 1952

2,609,801

UNITED STATES PATENT OFFICE 2,609,801

INTERNAL-COMBUSTION ENGINE AND COOLING SYSTEM THEREFOR

Elmer C. Kiekhaefer, Cedarburg, Wis.

Application September 24, 1949, Serial No. 117,674

8 Claims. (Cl. 123—41.72)

This invention relates to internal-combustion engines and particularly to the cooling system of engines of certain applications such as outboard motors having a number of cylinders arranged in vertical order.

The invention provides for the circulation of coolant over the domes of the vertically arranged cylinders individually prior to circulation of the coolant through other parts of the engine.

An object of the invention is to cool uniformly the individual cylinders.

Another object is to prevent overheating of the crankcase by the exhaust of the engine.

Another object is to ensure maximum cooling of the cylinder domes and engine.

A further object is to introduce the cooling water into the coolant cavity adjacent the cylinder domes.

Another object is to eliminate the need of temperature regulating means to maintain the temperature of the engine at normal operating levels.

These and other objects and advantages will be more fully set forth in the following description of a preferred embodiment of the invention illustrated in the accompanying drawings.

In the drawings:

Fig. 11 is a side elevation of part of an engine showing another embodiment of the invention;

Fig. 12 is a view similar to Fig. 11 with parts of the cover plate and jacket broken away and sectioned; and Fig. 13 is a transverse section taken on line 13—13 of Fig. 11.

Figure 1:
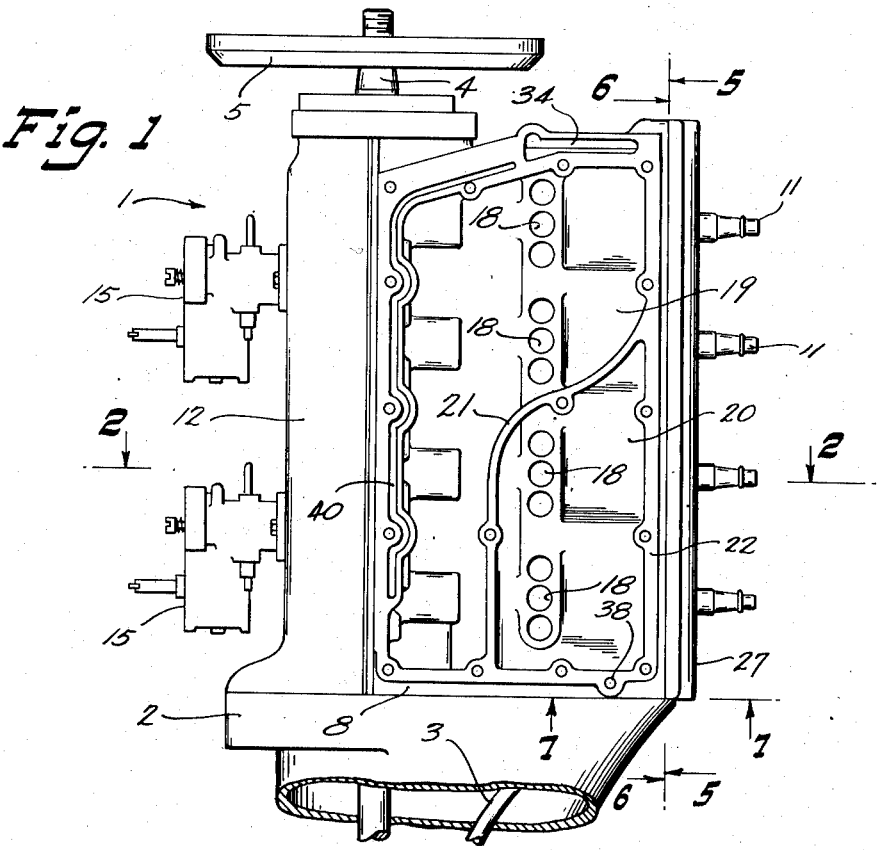
Figure 1 is a side elevation of a four cylinder engine having a vertically disposed crankshaft with certain parts removed to show the exhaust chambers of the engine block.
Figure 2:
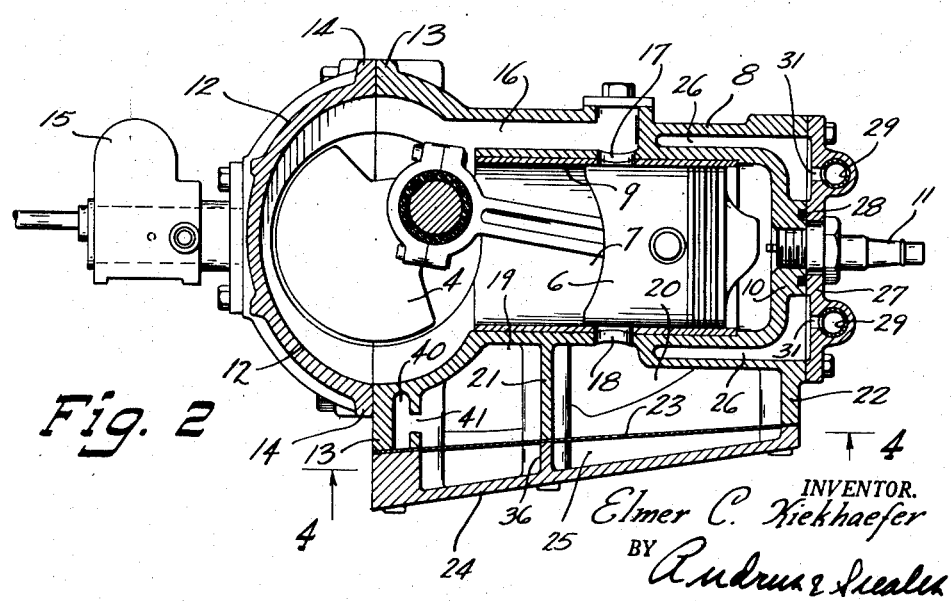
Fig. 2 is an enlarged horizontal section taken through one of the cylinders of the engine on line 2—2 of Fig. 1.
Figure 3:
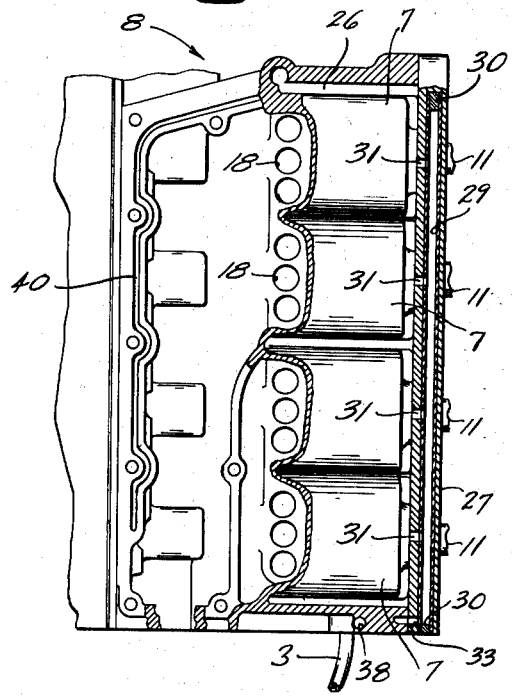
Fig. 3 is a side elevation of the cylinder block and cover partly broken away and sectioned to show the cylinder domes and supply pipes.
Figure 4:
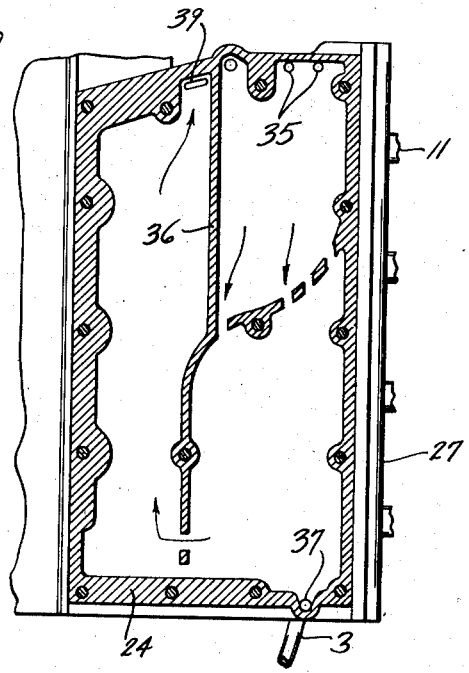
Fig. 4 is a view taken on line 4—4 of Fig. 2.
Figure 5:
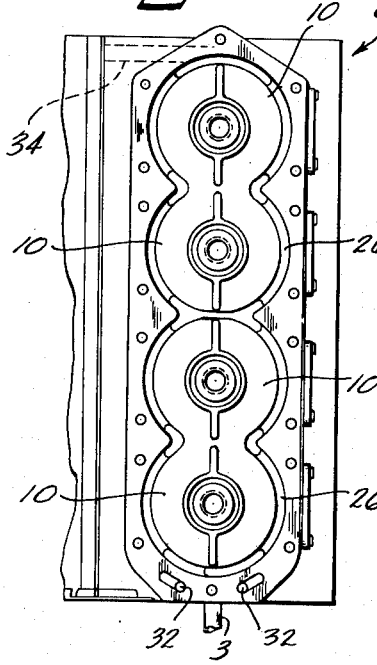
Fig. 5 is a view taken on line 5—5 of Fig. 1 showing the cylinder domes.
Figure 6:
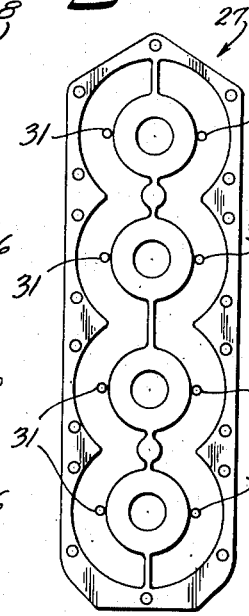
Fig. 6 is a view taken on line 6—6 of Fig. 1 showing the cylinder block cover.

The two-cycle internal-combustion engine 1 shown in the drawings is mounted on the drive shaft housing 2 of an outboard motor, not otherwise shown, which includes a water supply means operating with the motor and connected to engine 1 by the pipe 3 extending upwardly within housing 2 to the lower end of the engine.

Engine 1 comprises the vertically disposed crankshaft 4 carrying the flywheel 5 at its upper end. A piston 6 operates within each of four cylinders 7 arranged with their axes horizontally disposed in a common vertical plane.

The cylinder block 8 is preferably formed of lightweight alloy and cast with the individual steel or cast iron sleeves 9 which form the side walls of the cylinders. The upper dome 10 of each cylinder is formed by integral portions of the block which are provided with threaded holes adapted to receive and carry the spark plugs 11.

The crankcase of engine 1 is comprised of the crankcase member 12 and complementary skirt portions of block 8 which are secured together by suitable bolts extending through the flanges 13 and 14 of the block and crankcase member, respectively.

Engine 1 is of two-cycle operation in which the fuel mixture is supplied by the carburetor 15 to individual crank chambers of the crankcase through valve means, not shown. A transfer passage 16 formed in block 8 on one side of the engine opens from each crank chamber into the respective cylinder 7 through the ports 17 in the wall of the cylinder.

The exhaust ports 18 of each cylinder open therefrom oppositely of ports 17 and with ports 17 are adapted to be opened and closed by the piston 6 operating in the respective cylinder.

Ports 18 open from the upper and lower pairs of cylinders 7 into the adjacent chambers 19 and 20, respectively, formed in the side of block 8 and separated by the central wall 21 wherein engine 1 is similar to that described and claimed in the copending application of the present inventor filed September 23, 1949, Serial No. 117,326.

The outer wall 22, defining chambers 19 and 20, is formed integrally with block 8 and with flange 13 on the corresponding side of the block is provided with a planiform face against which the thin flat metal plate 23 and jacket member 24 are secured. Chambers 19 and 20 open downwardly individually into housing 2 to provide for discharge of the exhaust into the housing and are otherwise closed by plate 23.

The jacket 24 secured to block 8 over plate 23 is provided with a recessed inner face providing the coolant cavity 25, as will be more fully described.

The cavity 26 formed in block 8 opening upwardly thereof with respect to cylinders 7 is closed by the cover 27. Cover 27 is provided with holes accommodating the spark plugs 11 and is disposed in tight engagement with the O-ring seals 28 seated in the reduced upper ends of cylinder domes 10.

Cavity 26 extends over domes 10 and around the upper portions of cylinders 7 to the ports 17 and 18 on both sides so that substantially the entire upper end of each cylinder in which the combustion takes place is exposed to the water circulated through the cavity, as will be described.

The two stand-pipes 29 cast integrally within cover 27 on each side of spark plugs 11 extend the height of the cover and are closed at each end by the plugs 30. Each pipe is disposed so that the holes 31 drilled in cover 27 and through one wall of the pipes open into cavity 26 adjacent the dome 10 of each cylinder 7.

Figure 7:
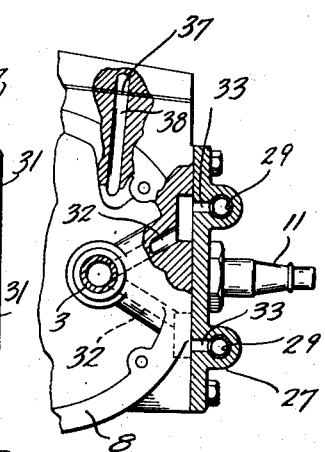
Fig. 7 is an enlarged detail view taken on line 7—7 of Fig. 1 showing the intake coolant supply line.

The upper end of supply pipe 3 is seated and secured in a hole in the lower end of block 8, as shown in Fig. 7, and communicates with the lower end of pipes 29 through the drilled and cored passages 32 registering with the corresponding holes 33 which are drilled in cover 27 and into pipes 29.

The aperture 34 in the upper end of block 8 from cavity 26 opens through the holes 35 in plate 23 into cavity 25 on one side of the vertical partition wall 36 formed integrally with jacket 24.

According to the invention, the water supplied through pipe 3 to the block first passes through passages 32 and holes 33 into pipes 29 in cover 27. The water entering cavity 26 through holes 31 passes directly over the domes 10 to effect maximum cooling of the latter. The water upon filling cavity 26 then passes through aperture 34 and holes 35 into cavity 25 on one side of partition 36.

The small discharge hole 37 at the bottom of coolant cavity 25 in plate 23 registers with the passage 38 in block 8 which opens into housing 2 and allows a fraction of the total water supply to be discharged therefrom.

The water not discharged passes through openings at the lower end of partition 36 and passes upwardly on the opposite side of partition 36 to the slot 39 in plate 23 which registers with the upper end of the narrow coolant cavity 40.

Cavity 40 extends forwardly from the top of block 8 and then downwardly in flange 13 of block 8 and is closed by plate 23. Several holes 41 near the lower end of cavity 40 provide for discharge of the water into cavity 19 and against wall 21 dividing cavities 19 and 20 to cool the same.

The water from block 8 entering chambers 19 and 20 and housing 2 through passage 38 and holes 41 is discharged with the exhaust of engine 1 from the lower end of housing 2, not shown, which opens preferably under water.

The water passing through cavities 25 and 40 serves to cool the adjacent parts of the engine against overheating by the exhaust, and particularly the crankcase of the engine.

The introduction of the water into cavity 26 from cover 27, as described, assures uniform cooling of all the cylinders throughout the full range of engine operation and coolant supply.

In starting engine 1, the coolant cavities are preferably empty of water and are filled shortly after the flow of water has started. Cavity 26 fills with water before the water passes across the top into cavity 25, as described, and is maintained full at all times during engine operation.

Figure 8:
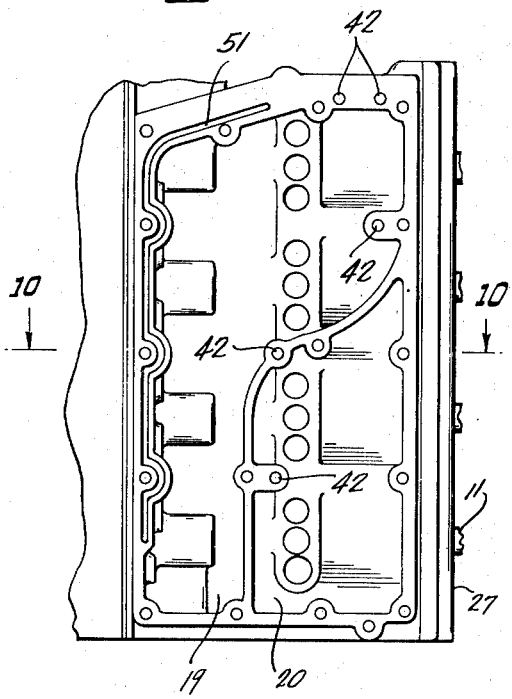
Fig. 8 is a side elevation of an alternate embodiment of the invention.
Figure 9:
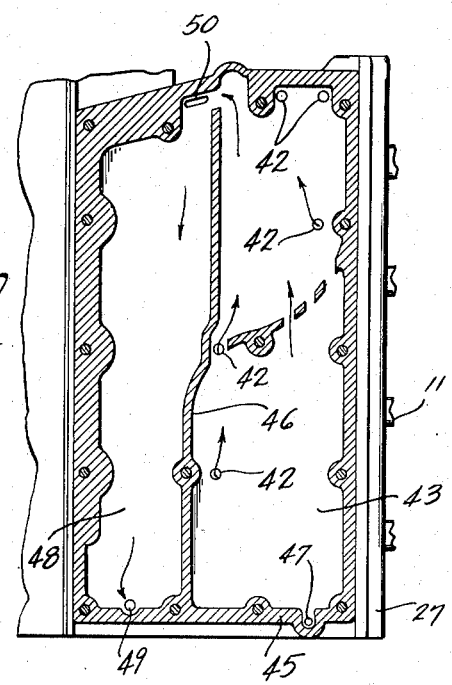
Fig. 9 is a view similar to Fig. 4 of the engine shown in part in Fig. 8.
Figure 10:
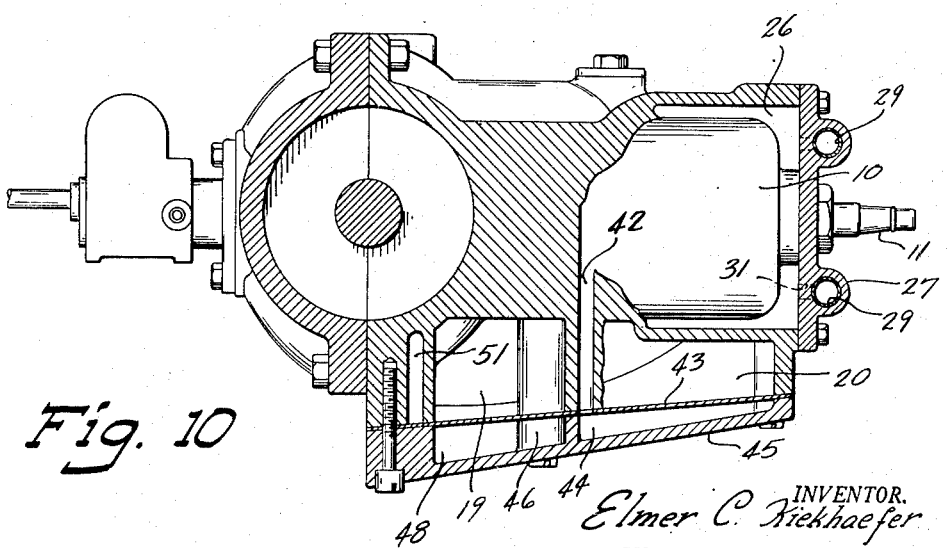
Fig. 10 is an enlarged view similar to Fig. 2 taken on line 10—10 of Fig. 8.

In the embodiment of the invention shown in Figs. 8 through 10, a series of spaced passages 42 communicate with cavity 26 and open through the plate 43 into the cavity 44 formed by the jacket member 45 on one side of the partition wall 46.

Holes 31 in pipes 29 direct the water coolant over the domes 10 of the cylinders as in engine 1. Each passage 42 opens from cavity 26 adjacent the respective cylinder of the engine to provide for a certain amount of individual water circulation for each cylinder.

Cavities 26 and 44 fill together with water until the water reaches the top of partition 46.

A part of the water is discharged through the small hole 47 at the bottom of cavity 44 and the greater part of the water passing over partition 46 into cavity 48 is discharged into chamber 19 through the hole 49. Part of the water also passes through the slot 50 at the top of cavity 48 into the narrow cavity 51 formed in the cylinder block and similar to cavity 40 of engine 1.

The embodiment of the invention shown in Figs. 11 through 13 provides the large water chamber 52 between the exhaust chamber 53 and the crank chambers of crankcase 12 of the engine.

The plate 54 secured to the cylinder block 55 closes chamber 52 and the adjacent exhaust chambers 53 and 56 formed in the side of block 55. The double wall 57 dividing chambers 53 and 56 extends from the center height of chamber 52 to the bottom of block 55 and provides the channel 58 therebetween. The upper end of channel 58 communicates with chamber 52 and opens at the lower end through block 55 directly into the drive shaft housing 2.

The jacket member 59, which is similar to members 24 and 45 described above, is provided with a similar recessed inner face which, when secured against plate 54, defines the coolant cavity 60 which is adapted to receive water from the upper end of the cylinder coolant cavity 26 through the holes 61 in plate 54 which register with the opening 62 at the upper end of block 55 and are disposed on one side of the partition 63.

A fraction of the water entering cavity 60, as described is allowed to pass therefrom through the hole 64 in the lower end of plate 54 which registers with the lower end of channel 58 and therefrom is discharged into housing 2.

The water, not discharged from cavity 60, is forced by the pressure of the circulating system to pass upwardly within cavity 60 on the opposite side of partition 63 to the hole 65 in plate 54 which opens into the upper end of coolant chamber 52.

The hole 66 in block 55 at the lower end of chamber 52 opens directly downwardly into drive shaft housing 2 and provides for discharge from chamber 52 of the greater part of the water and which does not pass into channel 58.

The larger water chamber 52 is normally full of water in the operation of the engine and ensures adequate cooling of the adjacent parts of the engine.

The invention provides means for receiving a single supply of coolant and distributing the same evenly throughout the cylinder coolant cavity and thereafter circulating the coolant through the engine adjacent the exhaust chambers to cool the same.

In an outboard motor the engine is not adversely affected by operating in extremely cold water which is supplied through pipe 3 to the engine and first directed over the cylinder domes.

At idling speeds the water is appreciably heated in passing over the domes so that the water does not over-cool the engine or parts thereof below optimum operating temperatures.

Various embodiments of the invention may be employed within the scope of the following claims.

I claim:

1. In an internal-combustion engine, a block having at least one cylinder bore opening in one direction and a dome closing the upper end of each cylinder, a wall member formed integrally with said block defining a cavity opening oppositely of said bore and substantially surrounding the upper end of said cylinder and dome, a cover member secured to said wall member extending over said dome and closing said cavity, a coolant supply passage within said cover opening into said cavity and disposed to direct the coolant against said cylinder dome, and means providing for the discharge of the coolant from said cavity.

2. In an internal-combustion engine, a cylinder block of lightweight alloy and including and supporting a hard-metal cylinder sleeve closed at its upper end by lightweight alloy portions of said block forming the cylinder dome, a coolant jacket providing a coolant cavity substantially surrounding the upper end of said cylinder sleeve and said dome, and a coolant supply passage opening into said cavity disposed to direct the coolant upon entering said cavity initially against said portions forming the cylinder dome and thereafter to circulate the coolant about the cylinder sleeve.

3. An engine of the class described comprising a cylinder block having a number of cylinders disposed parallel to each other and a cavity formed in said block surrounding the upper ends of said cylinders, and a cover closing said cavity and having a conduit opening into said cavity in a direction toward the upper ends of each said cylinder, said conduit being adapted to receive water coolant and to introduce the water into said cavity against the upper ends of said cylinders.

4. In a vertically disposed engine of the class described, a cylinder block having a number of cylinders arranged in line, wall members forming a coolant cavity surrounding the dome-ends of said cylinders, a conduit disposed vertically and opening into said cavity in a direction towards the domes of each of said cylinders, and coolant supply means connected to the lower end of said conduit adapted to deliver coolant under pressure through said conduit into said cavity and directed against the domes of said cylinders to cool the same.

5. In an internal combustion engine, a cylinder block having a number of cylinders arranged in-line and opening into an exhaust chamber formed in the side of said block and a coolant cavity formed in said block surrounding the domes of the cylinders, means closing said chamber and defining a second coolant cavity adjacent said chamber, passages providing communication between the upper ends of said cavities, a discharge passage from said last named cavity, and a cover closing said first named cavity having a conduit opening into said first named cavity in a direction toward the upper end of each of said cylinders, said conduit being adapted to receive and introduce water coolant against the domes of said cylinders and thereafter circulate said coolant through said first and second cavity under pressure.

6. An engine block including a number of cylinders arranged in line and opening into adjacent exhaust chambers formed in one side of the block and divided by a partition wall formed integrally with said block, a coolant cavity formed integrally with said block adjacent said chambers and opening into one of said chambers to direct coolant against said partition wall to cool the same.

7. In an internal combustion engine, a cylinder block having a number of cylinders arranged in-line and opening into an exhaust chamber formed in the side of said block and a coolant cavity formed in said block surrounding the domes of the cylinders, means closing said chamber and defining a second coolant cavity adjacent said chamber, passages providing communication between the upper ends of said cavities, a discharge passage from said last named cavity, a cover closing said first named cavity having a conduit opening into said first named cavity in a direction toward the upper end of each of said cylinders, said conduit being adapted to receive and introduce water coolant against the domes of said cylinders and thereafter circulate said coolant through said first and second cavity under pressure, and a discharge opening from said second cavity into said chamber disposed to direct coolant entering said chamber against one wall thereof to cool the same.

8. In an internal combustion engine having a vertically disposed crankshaft and crankcase therefor, a cylinder block forming a part of said crankcase and having a number of cylinders arranged in line and opening into an exhaust cavity formed in the side of said block, a jacket closing the side of said cavity to define a chamber, said chamber opening downwardly of said block to discharge the exhaust gases therefrom, a first coolant cavity formed in said block surrounding said cylinders, a second coolant cavity formed in said jacket, a third cavity formed in said block between said chamber and the engine crankcase, said second cavity opening into and affording communication between said first and third cavities, and a vertical conduit opening into said first named cavity in a direction toward the upper end of each of said cylinders to direct equal portions of coolant over said cylinders into said cavity under pressure and thereafter circulate said portions together through said second and third cavities, successively, under pressure.

ELMER C. KIEKHAEFER.

REFERENCES CITED

The following references are of record in the file of this patent:

UNITED STATES PATENTS

| Number | Name | Date |
|---|---|---|
| 1,156,312 | Regenbogen et al. | Oct. 12, 1915 |
| 1,434,348 | Bull | Oct. 31, 1922 |
| 1,476,327 | Dusenberg | Dec. 4, 1923 |
| 1,552,515 | Spencer | Sept. 8, 1925 |
| 1,573,211 | McWhite | Feb. 16, 1926 |
| 1,620,917 | Pendock | Mar. 15, 1927 |
| 1,640,950 | Lucke | Aug. 30, 1927 |
| 1,677,305 | Sperry | July 17, 1928 |
| 1,754,689 | MacPherson | Apr. 15, 1930 |
| 1,878,165 | Moorhouse | Sept. 20, 1932 |
| 2,227,247 | Conover | Dec. 31, 1940 |

FOREIGN PATENTS

| Number | Country | Date |
|---|---|---|
| 202,297 | Great Britain | of 1923 |
| 327,078 | Great Britain | of 1930 |